(12) United States Patent
Tsuji

(10) Patent No.: US 12,270,766 B2
(45) Date of Patent: Apr. 8, 2025

(54) INSPECTION SUPPORT APPARATUS, INSPECTION SUPPORT METHOD, AND COMPUTER-READABLE MEDIUM

(71) Applicant: NEC Corporation, Tokyo (JP)

(72) Inventor: Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 474 days.

(21) Appl. No.: 17/618,019

(22) PCT Filed: Jun. 19, 2019

(86) PCT No.: PCT/JP2019/024294
§ 371 (c)(1),
(2) Date: Dec. 10, 2021

(87) PCT Pub. No.: WO2020/255298
PCT Pub. Date: Dec. 24, 2020

(65) Prior Publication Data
US 2022/0260500 A1    Aug. 18, 2022

(51) Int. Cl.
*G01N 21/88* (2006.01)
*G01B 11/00* (2006.01)
(Continued)

(52) U.S. Cl.
CPC ......... *G01N 21/8803* (2013.01); *G01B 11/02* (2013.01); *G01C 15/00* (2013.01);
(Continued)

(58) Field of Classification Search
CPC ....... G01N 21/8803; G01N 2021/8887; G01N 21/9515; G01B 11/02; G01B 11/002; G01C 15/00
See application file for complete search history.

(56) References Cited

U.S. PATENT DOCUMENTS

2017/0219336 A1* 8/2017 Kurtz ................. G01B 11/0616
2018/0144496 A1* 5/2018 Posner ..................... G06T 7/73
(Continued)

FOREIGN PATENT DOCUMENTS

| CN | 108564615 A | 9/2018 |
|---|---|---|
| JP | 2010-014693 A | 1/2010 |
| JP | 2018-105644 A | 7/2018 |

OTHER PUBLICATIONS

International Search Report for PCT Application No. PCT/JP2019/024294, mailed on Aug. 27, 2019.

*Primary Examiner* — Farhana A Hoque
*Assistant Examiner* — Joseph O Nyamogo
(74) *Attorney, Agent, or Firm* — Sughrue Mion, PLLC

(57) ABSTRACT

An inspection support apparatus (10) includes: an acquisition unit (11) configured to acquire information about specifications of a three-dimensional sensor, information about a shape and a planned placement position of each member to be inspected, and information about a planned installation position of the three-dimensional sensor; a simulation unit (12) configured to: calculate a distance between the planned placement position of each member and the planned installation position of the three-dimensional sensor based on the information acquired by the acquisition unit (11); generate virtual point group data, a plurality of times for each calculated distance and for each member; and obtains a range of variations of variances in a predetermined direction based on the virtual point group data, and a determination unit (13) configured to determine whether or not each member can be distinguished at the planned placement position thereof based on the above-described range of variations.

8 Claims, 14 Drawing Sheets

(51) Int. Cl.
*G01B 11/02* (2006.01)
*G01C 15/00* (2006.01)
*G01N 21/95* (2006.01)

(52) U.S. Cl.
CPC ...... *G01B 11/00* (2013.01); *G01N 2021/8887* (2013.01); *G01N 21/95* (2013.01)

(56) References Cited

U.S. PATENT DOCUMENTS

2018/0241923 A1* 8/2018 Lu .......................... G06V 20/64
2020/0378927 A1* 12/2020 Nishizawa ............. G05D 1/101

* cited by examiner

⊙ MEMBER TO BE INSPECTED

VIRTUAL POINT GROUP DATA OF MEMBER TO BE INSPECTED
CLOSEST IN DISTANCE FROM THREE-DIMENSIONAL SENSOR

D10 D13 D16 D19

VIRTUAL POINT GROUP DATA OF MEMBER TO BE INSPECTED
FARTHEST IN DISTANCE FROM THREE-DIMENSIONAL SENSOR

D10 D13 D16 D19

US 12,270,766 B2

INSPECTION SUPPORT APPARATUS, INSPECTION SUPPORT METHOD, AND COMPUTER-READABLE MEDIUM

This application is a National Stage Entry of PCT/JP2019/024294 filed on Jun. 19, 2019, the contents of all of which are incorporated herein by reference, in their entirety.

TECHNICAL FIELD

The present disclosure relates to an inspection support apparatus, an inspection support method, and a computer-readable medium.

BACKGROUND ART

When a reinforced concrete structure is built, it is necessary to carry out a bar arrangement inspection to inspect positions and thicknesses (diameters) of reinforcing bars placed in the structure. Patent Literature 1 discloses a technique for measuring reinforcing bars from a plurality of places in the structure using a three-dimensional laser scanner, integrating measurement data, and comparing the integrated measurement data with reference data to determine a reinforcing bar arrangement state.

CITATION LIST

Patent Literature

Patent Literature 1: Japanese Unexamined Patent Application Publication No. 2010-014693

SUMMARY OF INVENTION

Technical Problem

In carrying out inspection of checking whether or not the intended member to be inspected is placed at the predetermined position by measuring one or more members to be inspected using a three-dimensional sensor, it is necessary to formulate an inspection plan in advance such as where to install the three-dimensional sensor. In general, such inspection plan is formulated by a skilled inspector by relying on his/her own experiences. However, there are many situations where an inspector without sufficient experience needs to formulate an inspection plan urgently on the inspection site, and there has been a demand for an inspection support apparatus for enabling an inspector to easily formulate an inspection plan even in such situations.

The present disclosure has been made in view of the aforementioned background and an object thereof is to provide an inspection support apparatus for facilitating formulation of an inspection plan for carrying out inspection of checking whether or not the intended member to be inspected is placed at the predetermined position by measuring one or more members to be inspected using a three-dimensional sensor.

Solution to Problem

A first example aspect of the present disclosure is an inspection support apparatus including:
an acquisition unit configured to acquire information about specifications of a three-dimensional sensor configured to irradiate one or more members to be inspected with a beam and acquire point group data based on at least amplitude information of light, information about a shape and a planned placement position of each member to be inspected, and information about a planned installation position of the three-dimensional sensor;
a simulation unit configured to
calculate a distance between the planned placement position of the member to be inspected and the planned installation position of the three-dimensional sensor for each member to be inspected based on the information acquired by the acquisition unit,
generate virtual point group data, which is point group data estimated at the calculated distance, a plurality of times for each calculated distance and for each member to be inspected having difference shapes, and
obtain a range of variations of variances of the virtual point group data in a predetermined direction based on the virtual point group data generated a plurality of times; and
a determination unit configured to determine whether or not each member
to be inspected can be distinguished at the planned placement position thereof based on the range of variations obtained by the simulation unit.

A second example aspect of the present disclosure is an inspection support method including:
a first step of acquiring information about specifications of a three-dimensional sensor configured to irradiate one or more members to be inspected with a beam and acquiring point group data based on at least amplitude information of light, information about a shape and a planned placement position of each member to be inspected, and information about a planned installation position of the three-dimensional sensor;
a second step of calculating a distance between the planned placement position of the member to be inspected and the planned installation position of the three-dimensional sensor for each member to be inspected based on the information acquired in the first step, generating virtual point group data, which is point group data estimated at the calculated distance, a plurality of times for each calculated distance and for each member to be inspected having different shapes, and obtaining a range of variations of the variance of the virtual point group data in a predetermined direction based on the virtual point group data generated a plurality of times; and
a third step of determining whether or not each member to be inspected can be distinguished at the planned placement position thereof based on the range of variations obtained in the second step.

A third example aspect of the present disclosure is a non-transitory computer-readable medium storing a program for causing a computer to execute:
a first step of acquiring information about specifications of a three-dimensional sensor configured to irradiate one or more members to be inspected with a beam and acquiring point group data based on at least amplitude information of light, information about a shape and a planned placement position of each member to be inspected, and information about a planned installation position of the three-dimensional sensor;
a second step of calculating a distance between the planned placement position of the member to be inspected and the planned installation position of the three-dimensional sensor for each member to be inspected based on the information acquired in the first step, generating virtual point group data, which is point group data estimated at the calculated distance, a plurality of times for each calculated distance and for each member to be inspected having different shapes, and obtaining a range of variations of the variance of the virtual point group data in a predetermined direction based on the virtual point group data generated a plurality of times; and a third step of determining whether or not each member to be inspected can be distinguished at the planned placement position thereof based on the range of variations obtained in the second step.

Advantageous Effects of Invention

According to the present disclosure, it is possible to facilitate formulation of an inspection plan for carrying out inspection of checking whether or not intended member to be inspected is placed at a predetermined position by measuring one or more members to be inspected using a three-dimensional sensor.

DESCRIPTION OF EMBODIMENTS

Example embodiments of the present disclosure will be described below with reference to the drawings. For clarity of description, the following descriptions and drawings have been omitted and simplified as appropriate. In each of the drawings, the same elements are denoted by the same reference symbols, and repeated descriptions are omitted as necessary.

First Example Embodiment

Figure 1:
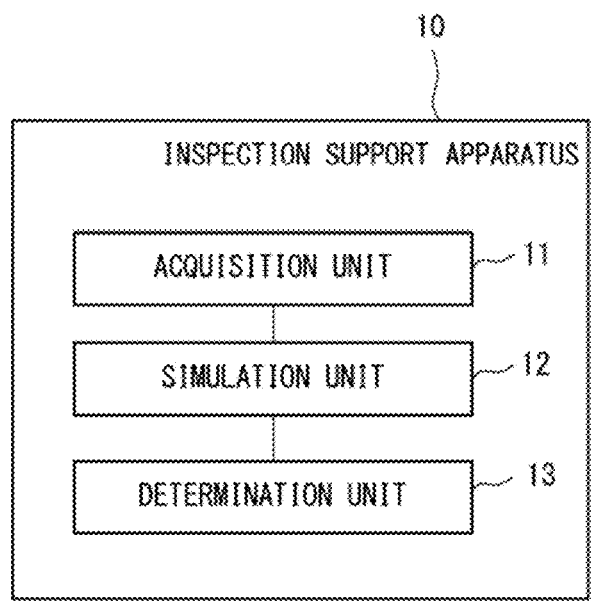
FIG. 1 is a block diagram showing a configuration of an inspection support apparatus according to a first example embodiment.

Hereinbelow, a first example embodiment will be described. FIG. 1 is a block diagram showing a configuration of an inspection support apparatus 10 according to a first example embodiment. As shown in FIG. 1, the inspection support apparatus 10 includes an acquisition unit 11, a simulation unit 12, and a determination unit 13.

The acquisition unit 11 acquires information about the specifications of a three-dimensional sensor, information about the shape and the planned placement position of the member to be inspected, and information about the planned installation position of the three-dimensional sensor. Here, the three-dimensional sensor may emit a beam on one or more members to be inspected to thereby acquire point group data based on at least amplitude information of light.

The simulation unit 12 calculates the distance between the planned placement position of the member to be inspected and the planned installation position of the three-dimensional sensor for each member to be inspected based on the information acquired by the acquisition unit 11. The simulation unit 12 further generates virtual point group data, which is point group data estimated for the calculated distance between the planned placement position of each member to be inspected and the planned installation position of the three-dimensional sensor, a plurality of times for each distance mentioned above and for each member to be inspected having different shapes, and obtains a range of variance in the variance of the virtual point group data in a predetermined direction based on the virtual point group data generated a plurality of times.

The determination unit 13 determines whether or not the member to be inspected can be distinguished at the aforementioned planned placement position thereof based on the range of variations of the variances of the virtual point group data in the predetermined direction obtained by the simulation unit 12.

By this configuration, it is possible to facilitate formulation of an inspection plan for carrying out inspection of checking whether or not an intended member to be inspected is placed at the predetermined position by measuring one or more members to be inspected using a three-dimensional sensor.

Second Example Embodiment

Hereinbelow, a second example embodiment will be described.

Figure 2:
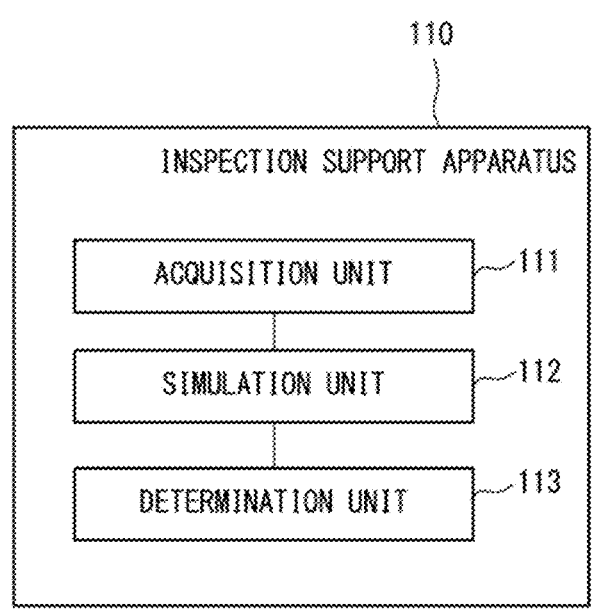
FIG. 2 is a block diagram showing a configuration of an inspection support apparatus according to a second example embodiment.

An inspection support apparatus according to the second example embodiment will be described. FIG. 2 is a block diagram showing a configuration of an inspection support apparatus 110 according to a second example embodiment. As shown in FIG. 2, the inspection support apparatus 110 includes an acquisition unit 111, a simulation unit 112, and a determination unit 113.

The acquisition unit 111 acquires information about the specifications of the three-dimensional sensor, information about the shape of the member to be inspected, drawing information of the inspection site, and information about the planned installation position of the three-dimensional sensor. Here, the three-dimensional sensor emits a beam on one or more members to be inspected to thereby acquire point group data based on at least amplitude information of light. The three-dimensional sensor is, for instance, a 3D-LiDAR (Light Detection and Ranging) sensor.

Figure 3:
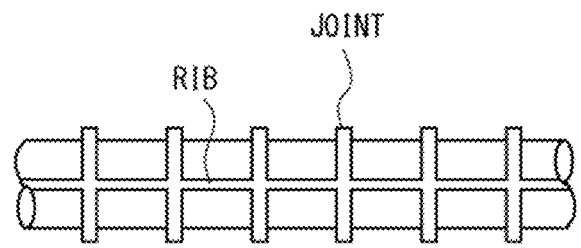
FIG. 3 is a schematic view showing an outer shape of a deformed steel bar which is a reinforcing bar serving as a member to be inspected by the inspection support apparatus according to the second example embodiment.

Here, the members to be inspected are reinforcing bars called deformed steel bars (also called deformed reinforcing bars). FIG. 3 is a schematic view showing an outer shape of one of the deformed steel bars. As shown in FIG. 3, the deformed steel bar is provided with uneven projections called "ribs" and "knots" on its surface. Standard names such as "D10", "D13", "D16", and "D19" are given to the deformed steel bars depending on their respective diameters. The numbers in the standard names indicate approximate diameters of the deformed steel bars, for example, the diameter of D10 is 9.53 mm and the diameter of D13 is 12.7 mm. That is, the diameters of the deformed steel bars are standardized at intervals of 2 to 3 mm.

Figure 4:
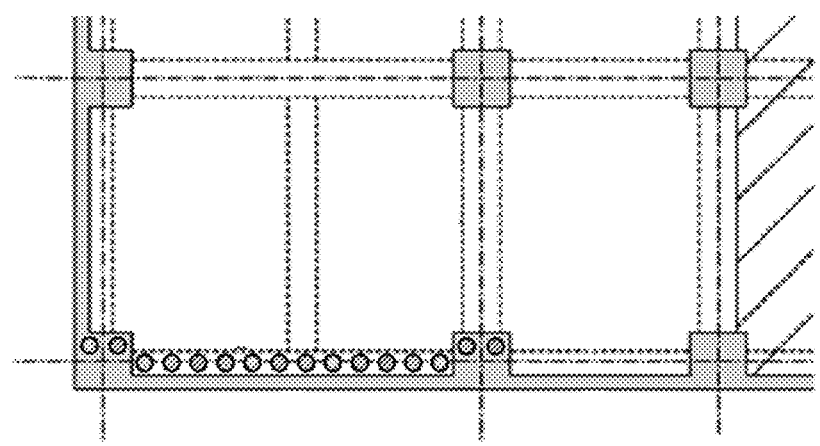
FIG. 4 is a schematic view showing an example of drawing information of an inspection site.

FIG. 4 is a schematic view showing an example of drawing information of an inspection site. As shown in FIG. 4, the drawing information of the inspection site is, for instance, a "plan diagram" in which an architectural blueprint is shown in a plane view in which the planned placement position of each member to be inspected is marked. The drawing information of the inspection site may be acquired by having the acquisition unit 111 (see, FIG. 2) access a storage medium such as a drawing management system.

Figure 5:
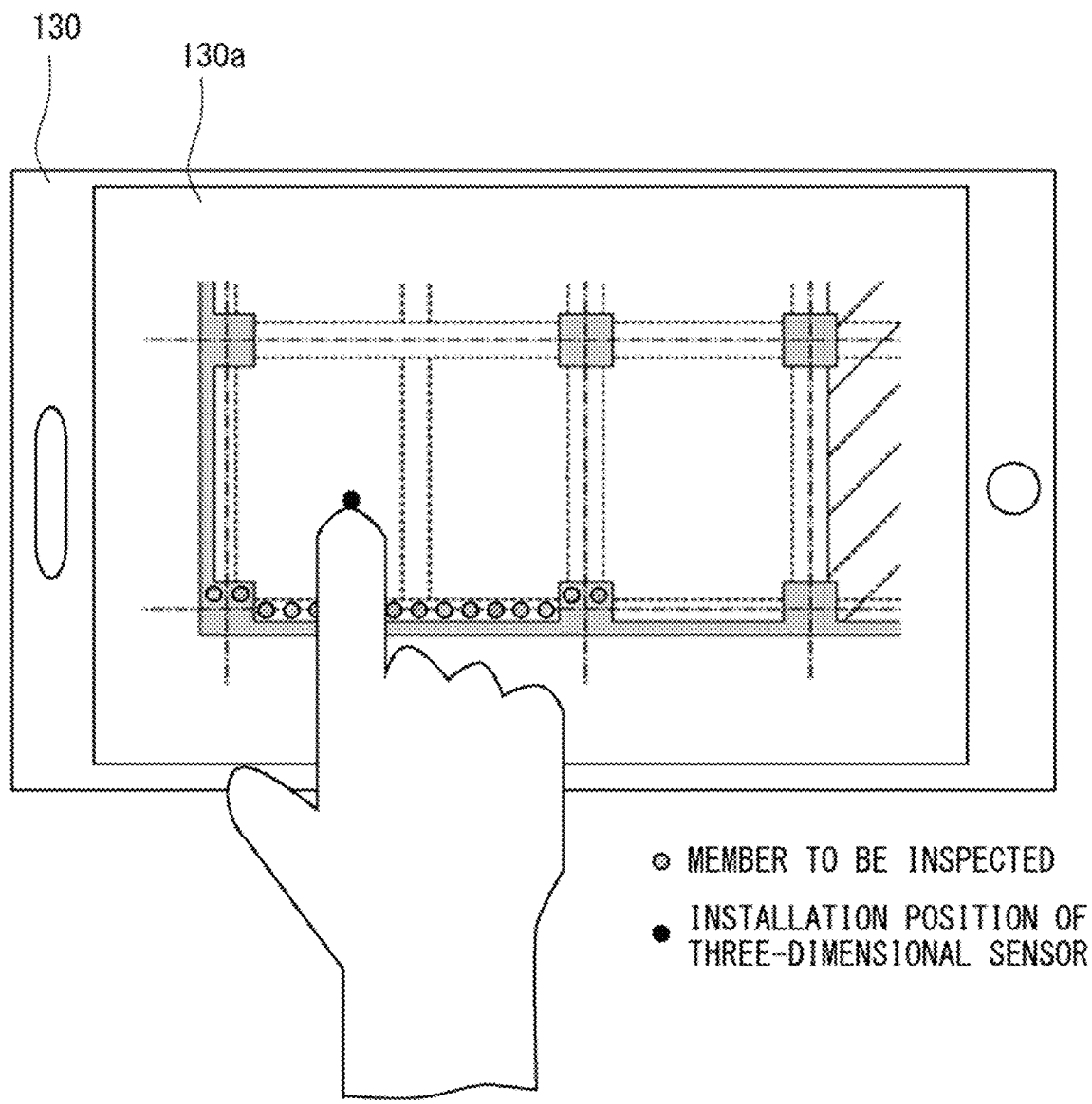
FIG. 5 is a schematic view illustrating an example of a method of entering information about a planned installation position of a three-dimensional sensor via an acquisition unit.

FIG. 5 is a schematic view illustrating an example of a method of entering information about a planned installation position of a three-dimensional sensor via the acquisition unit 111 (see, FIG. 2). As shown in FIG. 5, the acquisition unit 111 is a mobile terminal 130 such as a smartphone. The user directly plots the planned installation position of the three-dimensional sensor on the drawing of the inspection site displayed on a touch panel 130a that is a display screen of the mobile terminal 130 with his/her finger. Accordingly, the user can easily enter the planned installation position of the three-dimensional sensor.

The information about the specifications of the three-dimensional sensor and the information about the shape of the member to be inspected may be acquired by causing the acquisition unit 111 to access the storage medium in which the information about the specifications of the three-dimensional sensor and the information about the shape of the member to be inspected are stored in advance.

Referring again to FIG. 2, the simulation unit 112 calculates the distance between the planned placement position of each member to be inspected and the planned installation position of the three-dimensional sensor at an inspection site. In other words, the distance between the planned installation position of the three-dimensional sensor and the planned placement position of the member to be inspected is calculated for each member to be inspected at the inspection site. The simulation unit 112 calculates the distance between the planned placement position of each member to be inspected and the planned installation position of the three-dimensional sensor based on the information about the specifications of the three-dimensional sensor, the information about the shape of the member to be inspected, the drawing information of the inspection site, and the information about the planned installation position of the three-dimensional sensor.

Figure 6:
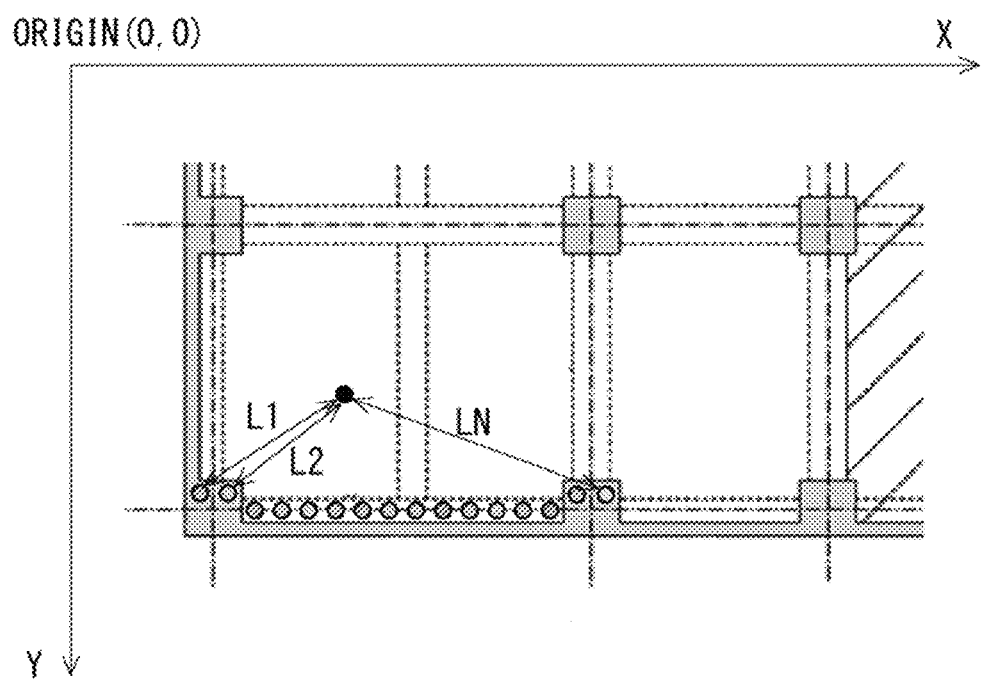
FIG. 6 is a schematic view showing virtual point group data of respective members to be inspected at planned placement positions thereof at the inspection site illustrated in FIG. 4.

FIG. 6 is a schematic diagram showing an example of a method of calculating the distance between a planned placement position of each member to be inspected and a planned installation position of the three-dimensional sensor at an inspection site. As shown in FIG. 6, the distance between the planned installation position of the three-dimensional sensor and each member to be inspected to be placed at the inspection site is calculated as L1, L2, . . . LN (herein, N=16), respectively. For instance, assuming that an orthogonal two-dimensional coordinate system (X, Y) having an origin (0, 0) at the predetermined position in the drawing of the inspection site is set, the coordinates of the planned installation position of the three-dimensional sensor and the coordinates of the planned placement position of each member to be inspected in the orthogonal two-dimensional coordinate system (X, Y) are determined. The distance between the planned placement position of the member to be inspected and the planned installation position of the three-dimensional sensor can be calculated from the coordinates of the planned installation position of the three-dimensional sensor and the coordinates of the planned placement position of the member to be inspected.

Referring again to FIG. 2, the simulation unit 112 generates each virtual point group data a plurality of times for each type of the member to be inspected to be placed at the inspection site for each distance between the planned placement position of the member to be inspected and the planned installation position of the three-dimensional sensor. Here, the virtual point group data is the point group data estimated to be acquired by the measurement actually at the inspection site using the three-dimensional sensor. Further, the type of the member to be inspected refers to the type as regards the shape of the member to be inspected.

Figure 7:
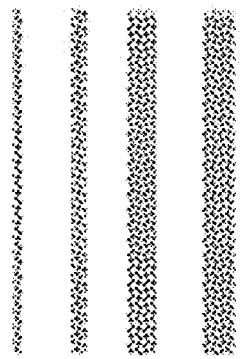
FIG. 7 shows schematic views each showing an example of virtual point group data.
Figure 7:
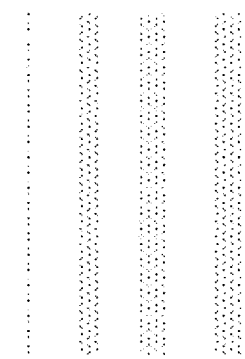

FIG. 7 shows schematic diagrams each showing an example of point group data of each member to be inspected at the respective planned placement positions at the inspection site illustrated in FIG. 6. The top diagram in FIG. 7 shows the virtual point group data of the four types of the reinforcing bars D10, D13, D16, and D19 at the planned placement position of the member to be inspected which is the closest in distance from the three-dimensional sensor. The bottom diagram in FIG. 7 shows the virtual point group data of the four types of the reinforcing bars D10, D13, D16, and D19 at the planned placement position of the member to be inspected which is the farthest in distance from the three-dimensional sensor. The number of points included in the virtual point group shown in the bottom diagram in FIG. 7 is small compared to that included in the virtual point group data shown in the top diagram in FIG. 7.

In general, the three-dimensional sensor emits a beam within a range of a certain angle of view while making slight adjustments in the beam emission direction. That is, the interval between the beams emitted from the three-dimensional sensor in adjacent directions increases as the distance from the three-dimensional sensor increases. Therefore, the farther the distance of the beam from the three-dimensional sensor, the less the number of points included in the point group data acquired by implementation of the three-dimensional sensor.

Further, the beam emitted by the three-dimensional sensor has a property of expanding in its diameter, and the longer the distance of the beam from the three-dimensional sensor, the larger the diameter of the beam becomes. When even a part of the beam hits the member to be inspected, there is a possibility of the point group data being acquired, and the farther the distance of the beam from the three-dimensional sensor, the wider the point group data acquired by the measurement actually performed at the inspection site using the three-dimensional sensor spreads than the size of the target member to be inspected and unclear outline of the point group data becomes.

Figure 8:
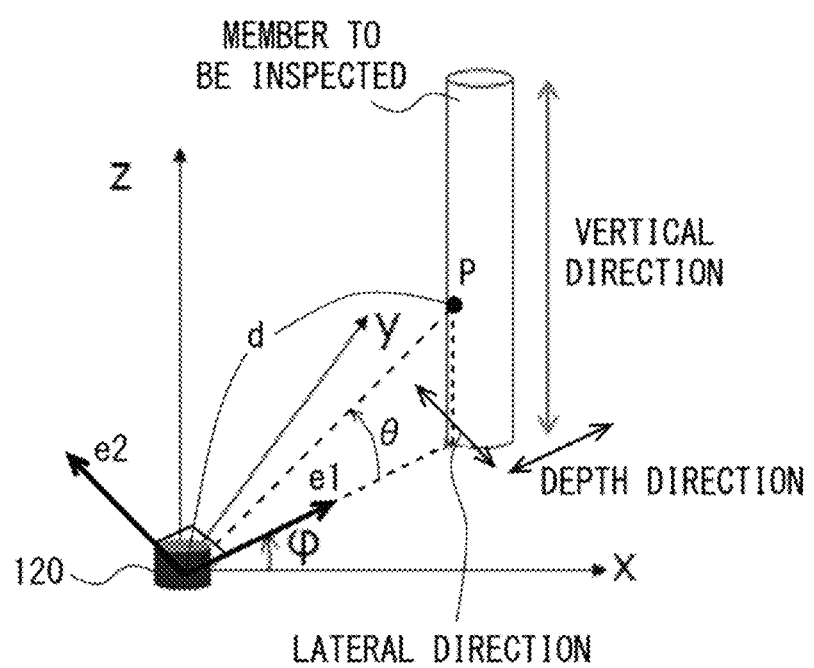
FIG. 8 is a schematic view for explaining a reference three-dimensional orthogonal coordinate system set in the simulation and the definitions of the directions of the member to be inspected.

FIG. 8 is a schematic view for explaining a reference three-dimensional orthogonal coordinate system set in the simulation and the definitions of the directions of the member to be inspected. As shown in FIG. 8, the reference three-dimensional orthogonal coordinate system has an origin at the position of the three-dimensional sensor 120, and is composed of an x-axis as a first axis, a y-axis as a second axis, and a z-axis as a third axis. The reference three-dimensional orthogonal coordinate system is set, for example, in such a way that the z-axis as the third axis is vertical, and a plane including the x-axis as the first axis and the y-axis as the second axis is horizontal.

The reference three-dimensional orthogonal coordinate system can be transformed into a reference three-dimensional polar coordinate system having an origin at the position of the three-dimensional sensor 120. It is assumed that a point P is a point where the beam emitted from the three-dimensional sensor 120 hits the member to be inspected. The point P is expressed as (x, y, z) in the three-dimensional orthogonal coordinate system and as (d, φ, θ) in the three-dimensional polar coordinate system. Here, d is a distance from the origin to the point P, i.e., a moving radius. φ is an angle formed by a projection of a radial vector (a vector from the origin to the point P) onto the x-axis and the xy plane. θ is an angle formed by the xy plane and the radial vector. The relations of x=d·cos θ·cos φ, y=d·cos θ·sin φ, and z=d·sin θ hold.

In FIG. 8, the vertical direction is the longitudinal direction of the member to be inspected. The lateral direction is a direction orthogonal to the irradiation direction of the beam when the area of the surface irradiated with the beam from the three-dimensional sensor 120 in the member to be inspected becomes the largest and also orthogonal to the vertical direction. The irradiation direction of the beam is a direction of an optical axis of the beam. The depth direction is a direction orthogonal to the vertical direction and the lateral direction. In the three-dimensional orthogonal coordinate system (x, y, z), the vertical direction is a direction parallel to the z-axis. In the three-dimensional orthogonal coordinate system (x, y, z), the lateral direction is a direction parallel to a vector e2 which is orthogonal, on the xy plane, to a direction vector e1 of projection of the beam emitted from the three-dimensional sensor 120 onto the xy plane. If the point P is a representative point of a part of the member to be inspected where the beam emitted from the three-dimensional sensor 120 hits, the angle formed by the projection of the beam emitted from the three-dimensional sensor 120 onto the xy plane with the x-axis corresponds to an angle φ. Note that the representative point where the beam hits the member to be inspected is on an optical axis of the beam.

Figure 9:
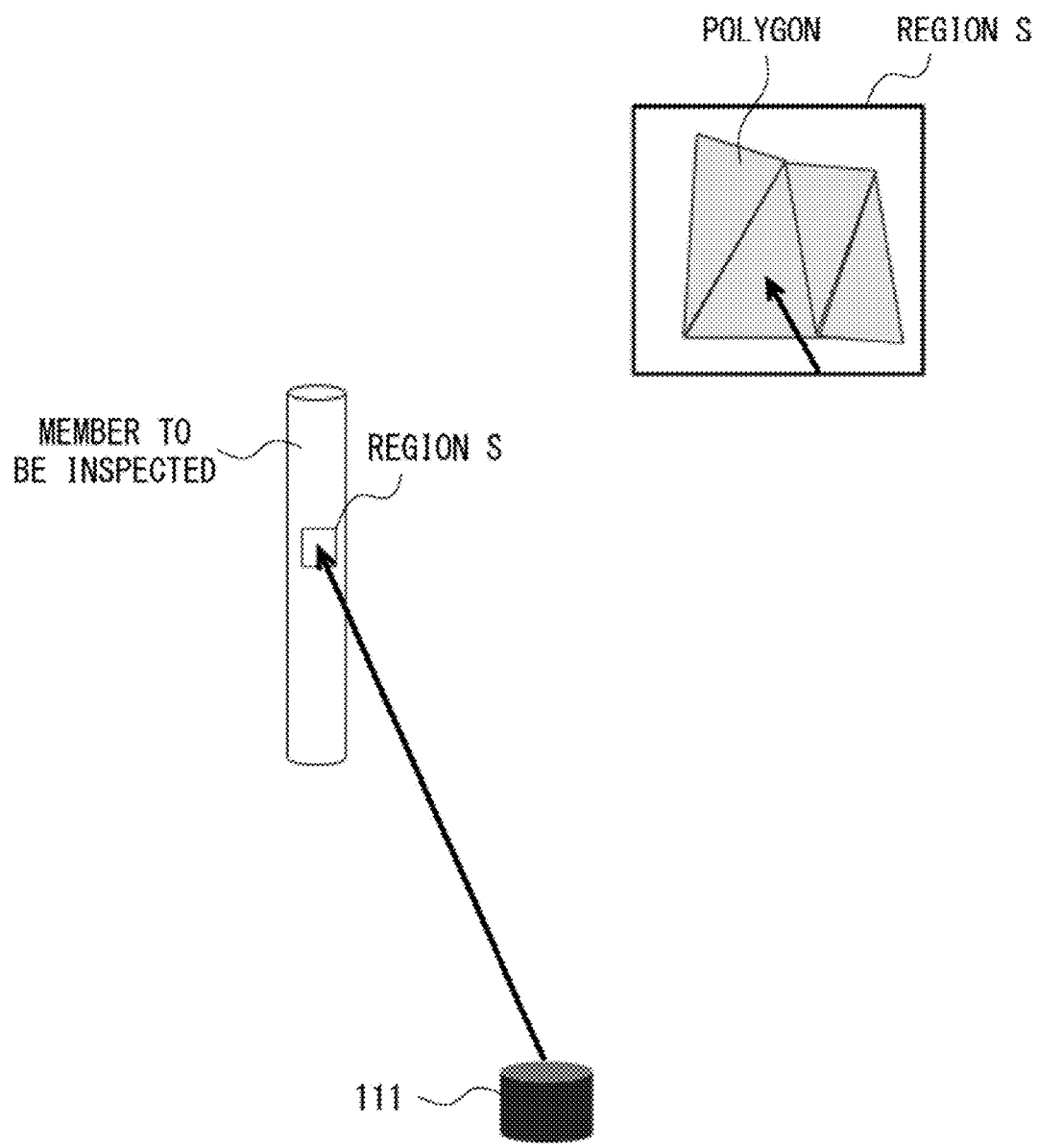
FIG. 9 is a schematic view showing a method of generating virtual point group data in a simulation unit.

FIG. 9 is a schematic view showing a method of generating the virtual point group data in the simulation unit 112 (see FIG. 2). As shown in FIG. 9, it is determined whether or not an intersection with the beam emitted from the three-dimensional sensor 120 is present within the range of a polygon for each polygon constituting the CAD drawing, which is included in the information about the shape of the object to be inspected, in which the member to be inspected is drawn. When it is determined that the intersection with the beam is within the range of the polygon, the intersection is defined as a point included in the virtual point group data. In this way, the simulation unit 112 virtually scans the member to be inspected by changing the irradiation direction of the beam in accordance with the specifications of the three-dimensional sensor to thereby generate the virtual point group data.

Figure 10:
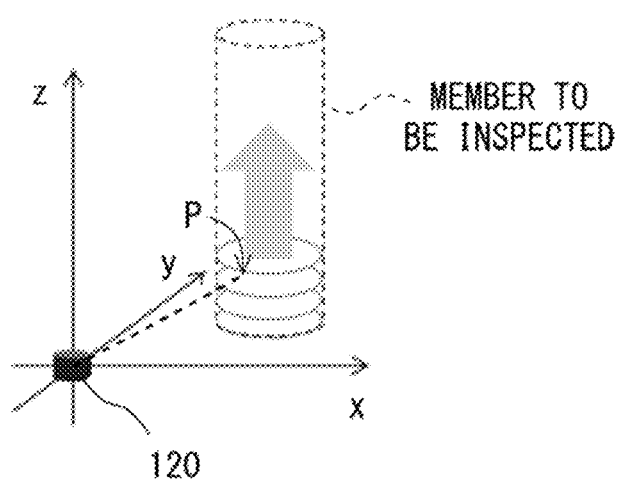
FIG. 10 is a schematic view showing another method different from the method described with reference to FIG. 9 of generating virtual point group data in the simulation unit.

FIG. 10 is a schematic view showing a method of generating the virtual point group data in the simulation unit 112 (see FIG. 2), which is different from the method described with reference to FIG. 9. As shown in FIG. 10, the member to be inspected is approximated to a simple shape which can be expressed by an equation, and the intersection of the shape and the beam emitted from the three-dimensional sensor 120 is stored as the point group data.

For example, when the member to be inspected is a reinforcing bar, the shape of the member to be inspected can be approximated as a cylinder. Therefore, the equation of the member to be inspected is approximated by the following equation of the cylinder.

Equation of cylinder: $(x-a)^2+(y-b)^2=1, m<z<n$

In this equation, (a, b) is a center coordinate of the cylinder of the member to be inspected in the three-dimensional orthogonal coordinate system described with reference to FIG. 8. m is a z-coordinate of a bottom surface of the cylinder of the member to be inspected, and n is a z-coordinate of a top surface of the cylinder of the member to be inspected.

The point P (see FIG. 8) at which the beam emitted from the three-dimensional sensor 120 hits the member to be inspected is expressed as x=d·cos θ·cos φ, y=d·cos θ·sin φ, and z=d·sin θ, as described above. When these equations are substituted into the equation of the member to be inspected, a quadratic equation for d is obtained. If a solution exists to this quadratic equation, the coordinates (x, y, z) of the point P can be obtained. Note that when there are two intersections between the beam emitted from the three-dimensional sensor 120 and the member to be inspected, two solutions exist to the above-mentioned quadratic equation. In this case, the intersection on the side close to the three-dimensional sensor 120 is the point (the point P) where the beam hits the surface of the member to be inspected, and the intersection on the side far from the three-dimensional sensor 111 is a point where the beam casts a shadow. Thus, the smaller one of the two solutions to the quadratic equation is referred to as d.

Figure 11:
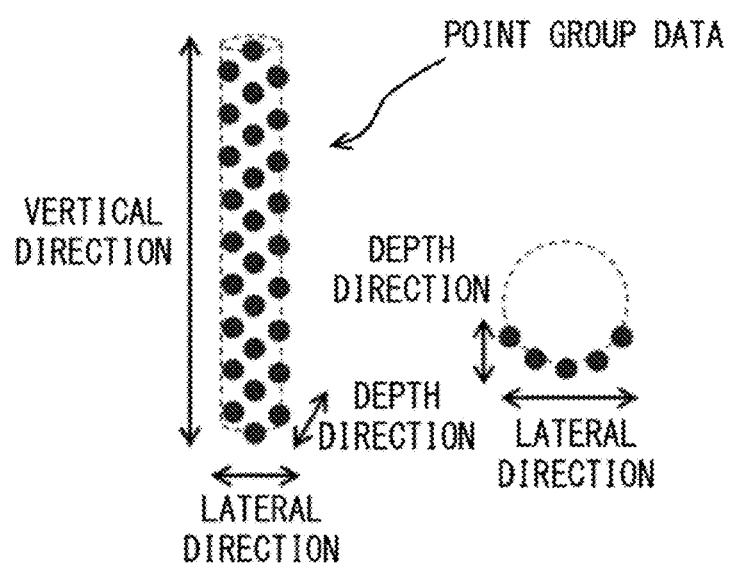
FIG. 11 is a schematic view illustrating predetermined directions in which the simulation unit determines variation of the variances of the virtual point group data.

Referring again to FIG. 2, the simulation unit 112 obtains the range of the variance of the virtual point group data in the predetermined direction. FIG. 11 is a schematic diagram for explaining the predetermined directions in which the simulation unit 112 (see, FIG. 2) determines variation of the variations of the virtual point group data. As shown in FIG. 11, in the reinforcing bar which is the member to be inspected, the variance of the virtual point group data in the vertical direction becomes the maximum. Further, since the point group data is present only on the surface facing the three-dimensional sensor 120, the variance in the lateral direction is larger than that in the depth direction. Since there is correlation between the variance of the virtual point group data in the lateral direction and the diameter of the reinforcing bar, the type of the member to be inspected can be distinguished from the variance of the virtual point group data in the lateral direction. Therefore, the lateral direction is defined as the predetermined direction in which the simulation unit 112 obtains variations of the variances of the virtual point group data.

In the simulation unit 112, variation of the variance of the virtual point group data in the lateral direction which is the predetermined direction occurs when the point group data which is the estimated point group data is generated a plurality of times by the method described with reference to FIG. 8 and the method described with reference to FIG. 9. Here, the range between the maximum value and the minimum value of the variances of the point group data in the predetermined direction is the range of variation of the variances.

Figure 12:
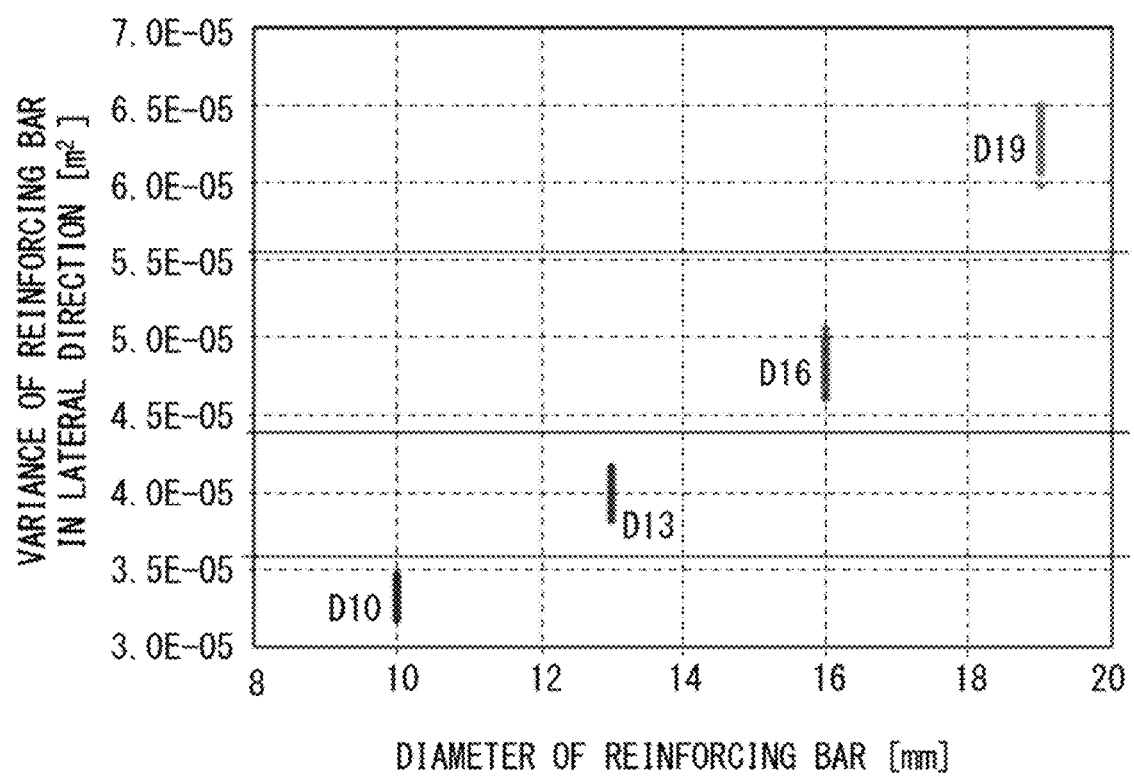
FIG. 12 is a graph in which variance of the virtual point group data generated a plurality of times by simulation in the lateral direction is plotted as regards the planned placement position of the member to be inspected closest in distance from the three-dimensional sensor.
Figure 13:
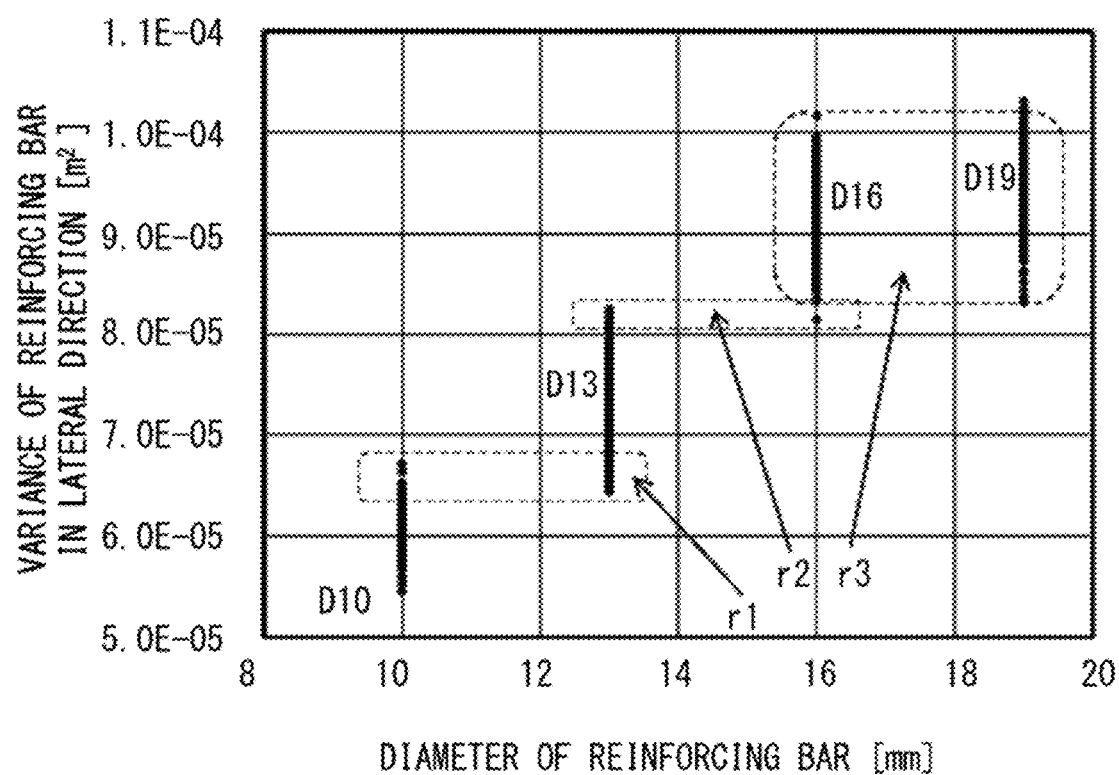
FIG. 13 is a graph in which variance of the virtual point group data generated a plurality of times by simulation in the lateral direction is plotted as regards the planned placement position of the member to be inspected farthest in distance from the three-dimensional sensor.

FIG. 12 is a graph in which the variances in the lateral direction obtained by executing a simulation a plurality of times are plotted in the simulation unit 112 as regards the planned placement position closest in distance from the three-dimensional sensor. FIG. 13 is a graph in which the variances in the lateral direction obtained by executing a simulation a plurality of times are plotted in the simulation unit 112 as regards the planned placement position farthest in distance from the three-dimensional sensor. Here, the planned placement position closest in distance from the three-dimensional sensor refers to the planned placement position closest in distance from the three-dimensional sensor among the planned placement positions of the respective members to be inspected at the inspection site illustrated in FIG. 6. Further, the planned placement position farthest in distance from the three-dimensional sensor refers to the planned placement position farthest in distance from the three-dimensional sensor among the planned placement positions of the respective members to be inspected at the inspection site illustrated in FIG. 6. In the graph, the horizontal axis represents the diameter of the reinforcing bar [mm], and the vertical axis represents the variance of the reinforcing bar in the lateral direction [m$^2$].

Various conditions of the simulations performed by the simulation unit 112 in order to obtain the graphs shown in FIGS. 12 and 13 are as follows.
1) The members to be inspected are four kinds of reinforcing bars (D10, D13, D16, and D19).
2) The three-dimensional sensor 120 is a 3D-LiDAR sensor with the following specifications.
   Horizontal angular resolution: 0.011°
   Vertical angular resolution: 0.1°
   Beam diameter at 0 m: 9.5 mm
   Beam spread angle: 3.0 mrad
   Ranging error: +/−3 cm (1σ, ranging error shall occur according to a normal distribution with a mean of 0 and a standard deviation of 3 cm.) 3) If even a part of the emitted beam hits the reinforcing bar, it is considered that the beam has hit the reinforcing bar.
4) The light reflected from the reinforcing bar shall return stochastically to the 3D-LiDAR according to the area hit by the beam. More specifically, if the ratio of the area where the beam has hit to the beam diameter (area where the beam has hit/beam diameter) is equal to or greater than a random number generated between 0.0 and 1.0, the reflected light returns to the 3D-LiDAR.
5) The shape of the reinforcing bar is cylindrical.
6) A simulation is executed 1000 times for each of the four kinds of reinforcing bars which are member to be inspected.

As shown in FIG. 12, the four types of the reinforcing bars (D10, D13, D16, and D19) differ in ranges of variations of the variances of the virtual point group data. Therefore, at the planned placement position closest in distance from the three-dimensional sensor, the type of the member to be inspected can be distinguished based on which one of the ranges of variations of variances of the virtual point group data of the four types of the reinforcing bars the variations of the point group data in the lateral direction acquired by the actual measurement by the three-dimensional sensor falls.

As shown in FIG. 13, the ranges of the variations of the variances of the virtual point group data in the lateral direction overlap in a region r1 in D10 and D13, in a region r2 in D13 and D16, and in a region r3 in D16 and D19. That is, the variances of the point group data in the lateral direction obtained by the actual measurement by the three-dimensional sensor 120 may be included in any of the regions r1, r2, and r3. Therefore, there may be cases where the type of the member to be inspected cannot be distinguished at the planned placement position that is the farthest in distance from the three-dimensional sensor.

Turning back to FIG. 2, the determination unit 113 determines whether or not the member to be inspected can be distinguished at the planned placement position based on the range of variations of the variances of the point group data of each member to be inspected in the predetermined direction corresponding to the distance between the planned placement position of the member to be inspected and the planned installation positon of the three-dimensional sensor. The determination unit 113 determines whether or not the member to be inspected can be distinguished at the planned placement position in accordance with the degree of the overlapping of the range of variations of the variances of the point group data in the predetermined direction among the different types of the members to be inspected corresponding to the distance between the planned placement position of the member to be inspected and the planned installation position of the three-dimensional sensor. That it, the determination unit 113 determines that the type of the member to be inspected can be distinguished when the planned placement position is a position where the degree of the overlapping of the ranges of variations in the variances of the point group data is relatively small as shown in FIG. 12. On the other hand, the determination unit 113 determines that the type of the member to be inspected can be distinguished when the planned placement position is a position where the degree of the overlapping of the range of variation of the variances of the point group data is relatively large as shown in FIG. 12.

Figure 14:
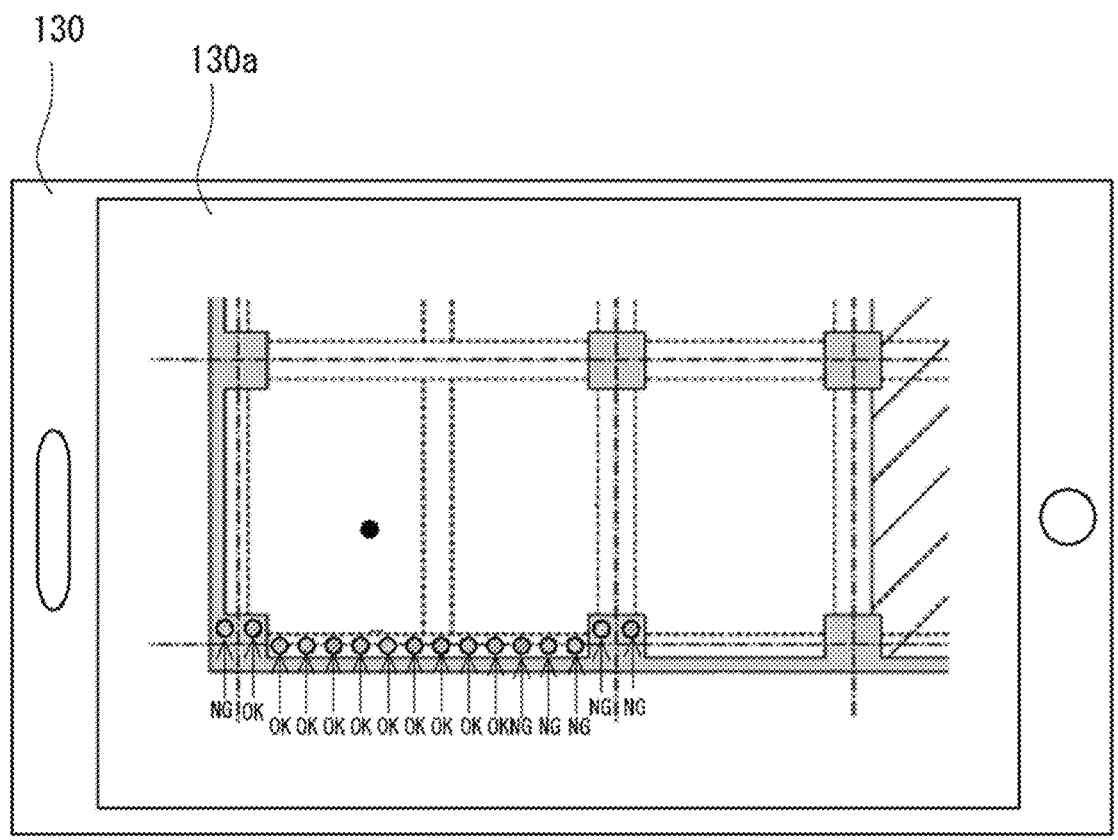
FIG. 14 is a schematic view showing an example of a state in which a determination result is displayed on a display unit.

A display unit for displaying the determination result obtained by the determination performed by the determination unit 113 for the planned placement position of each member to be inspected at the installation site may further be provided. FIG. 14 is a schematic diagram showing an example of a state in which a determination result is displayed on the display unit. As shown in FIG. 14, the display unit is the mobile terminal 130 such as a smartphone. That is, the mobile terminal 130 serving as the acquisition unit described with reference to FIG. 5 also functions as the display unit. The determination result is displayed in a superimposed manner on the drawing of the inspection site for every planned placement position of the member to be inspected at the inspection site. In the vicinity of the planned placement position at which the type of the member to be inspected can be distinguished, "OK" is displayed, and in the vicinity of the planned placement position at which the type of the member to be inspected cannot be distinguished, "NG" is displayed.

Figure 15:
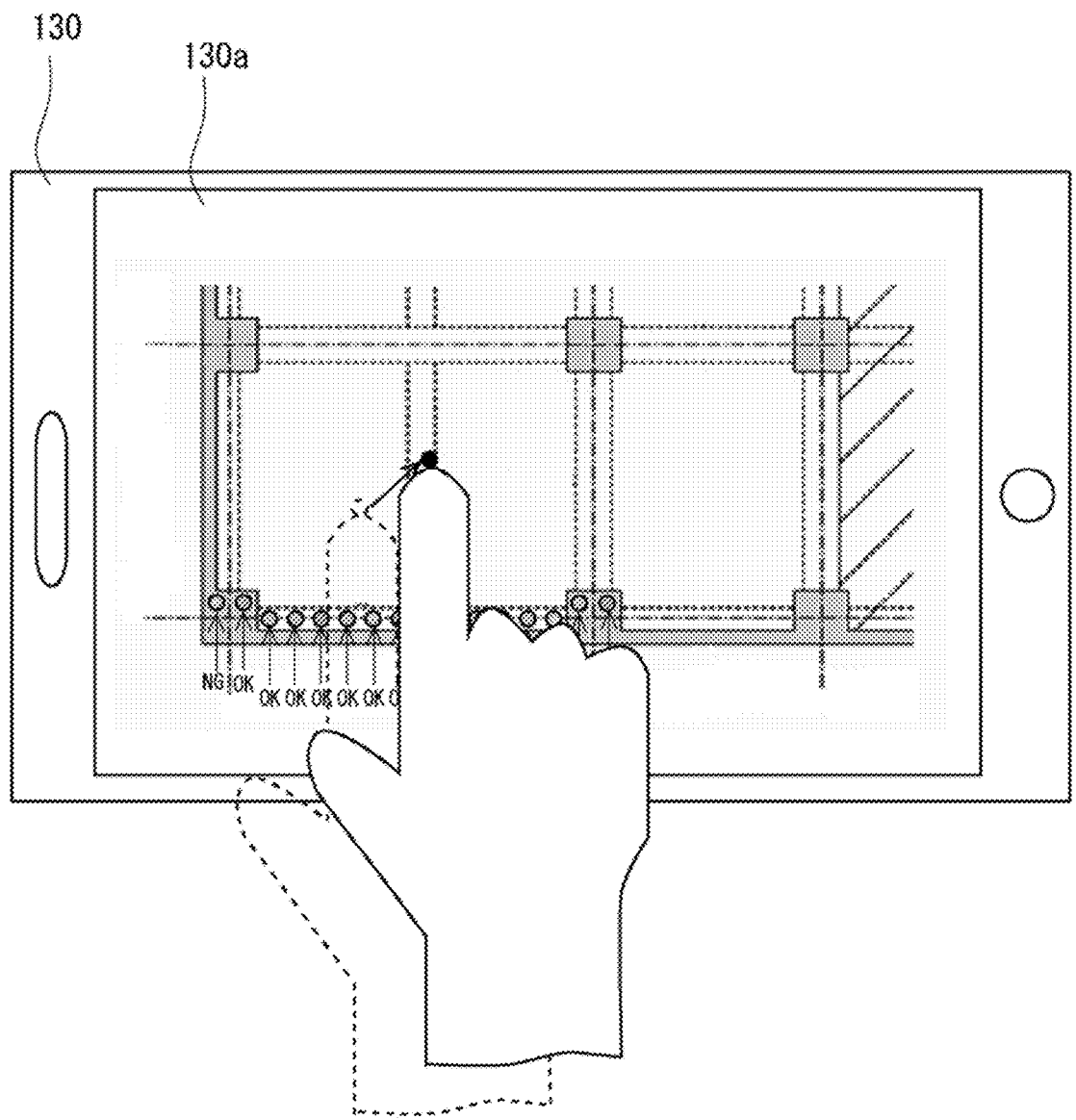
FIG. 15 is a schematic view illustrating resetting of the planned installation position of the three-dimensional sensor.

FIG. 15 is a schematic diagram for describing resetting of the planned installation position of the three-dimensional sensor. As shown in FIG. 15, the user who saw the determination result displayed on the mobile terminal 130 moves the planned installation position of the three-dimensional sensor to the position where it is considered that more preferable determination result can be obtained. The simulation unit 112 (see, FIG. 2) performs the aforementioned simulation on the newly set planned installation position of the three-dimensional sensor and obtains the ranges of variations of the variances of the virtual point group data of each type of the member to be inspected in the predetermined direction. Then, the determination unit 113 determines whether or not the member to be inspected can be distinguished at the planned placement position thereof. That is, when it is considered that there is room for further improvement based on the obtained determination result, by changing the position of the planned installation position of the three-dimensional sensor via the touch panel 130a, the determination result of the three-dimensional sensor at the newly planned placement position can be obtained. As described above, according to the inspection support apparatus 110 according to the second example embodiment, the user can easily perform consideration of the optimal planned installation position of the three-dimensional sensor whereby it is possible to facilitate formulation of an inspection plan.

As shown FIG. 13, even when the ranges of the variations of the variances of the virtual point group data in the lateral direction generated by the simulation overlap among the types of the members to be inspected, the possibility of the member to be inspected being distinguished increases by increasing the number of times the actual measurements of the member to be inspected at the planned placement position at the inspection site are performed. That is, by determining the most overlapping ranges of variations of the variances of the virtual point group data of the members to be inspected (here, the reinforcing members D10, D13, D16, and D19) on the ranges of variations of the variances of the point group data in the lateral direction obtained by the actual measurements, the type of each member to be inspected can be distinguished.

As described above, the determination unit 113 (see, FIG. 2) may estimate the number of times the measurements need to be actually performed at the inspection site at the respective planned placement positions in order to distinguish the members to be inspected based on the degree of the overlapping of the ranges of variations of the variances of the virtual point group data of each member to be inspected in the predetermined direction. The estimation may be performed by, for instance, accumulating the inspection results of the actual measurements performed at the inspection site in the past and performing machine learning using the accumulated inspection results. Further, the determination unit 113 may be configured to determine that it is impossible to distinguish the member to be inspected at the planned placement position when the number of times the member to be inspected are unmeasurable exceeds the predetermined threshold value in the actual measurement performed at the planned installation position of the inspection site.

Here, the flow of processing of determining whether or not the members to be inspected can be distinguished at the respective planned placement positions from the planned installation position of the three-dimensional sensor in the inspection support apparatus 110 according to the second example embodiment will be described. Note that in the following description, FIG. 2 will be referred to as appropriate.

Figure 16:
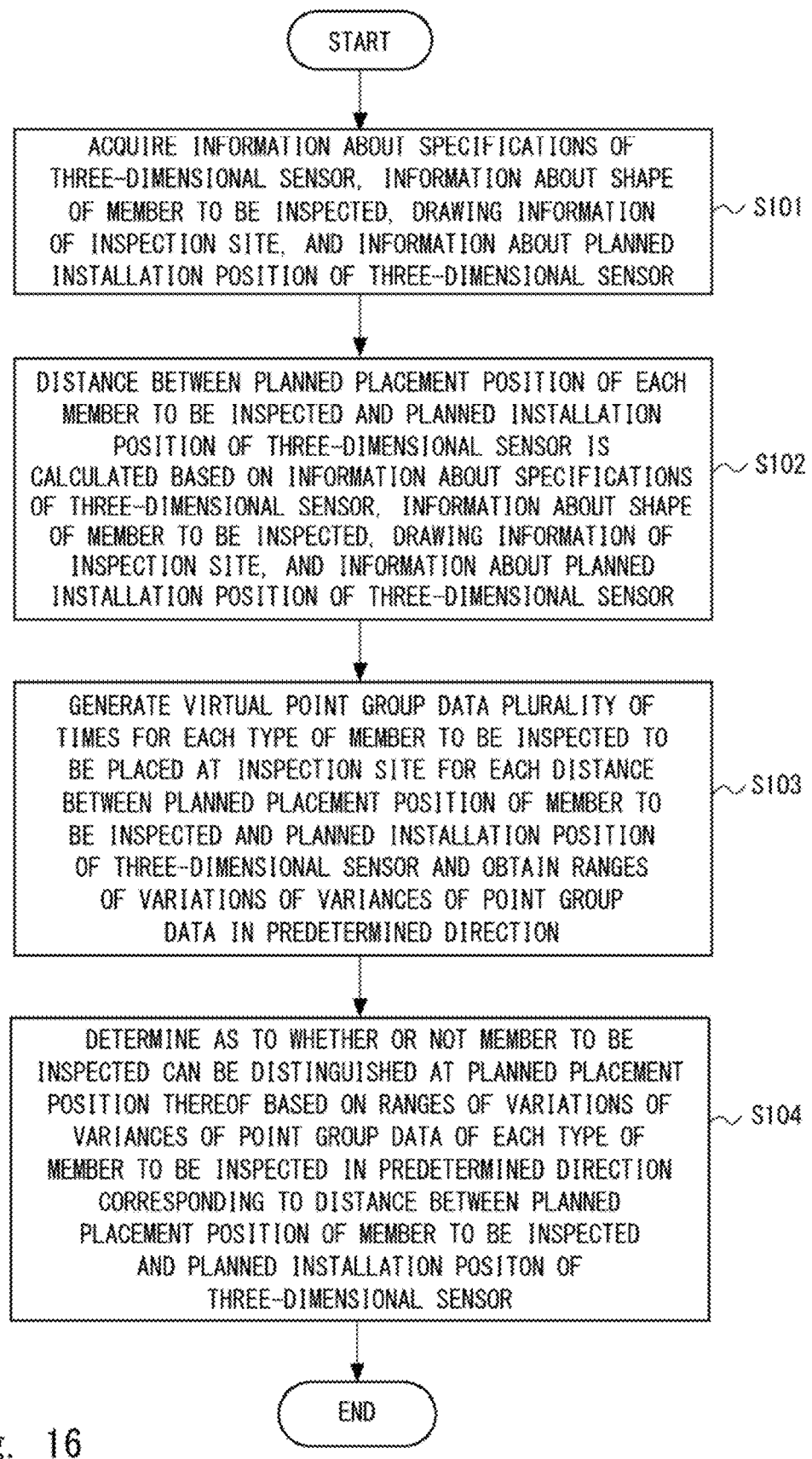
FIG. 16 is a flowchart for describing the flow of determination processing of determining whether or not the members to be inspected can be distinguished at the respective planned placement positions from the planned installation position of the three-dimensional sensor.

FIG. 16 is a flowchart for describing the flow of determination processing of determining whether or not the members to be inspected can be distinguished at the respective planned placement positions from the planned installation position of the three-dimensional sensor in the inspection support apparatus 110 according to the second example embodiment. As shown in FIG. 16, the information about the specifications of the three-dimensional sensor, the information about the shape of the member to be inspected, the drawing information of the inspection site, and the information about the planned installation position of the three-dimensional sensor are acquired (Step S101). Next, the distance between the planned placement position of each member to be inspected and the planned installation position of the three-dimensional sensor is calculated based on the information about the specifications of the three-dimensional sensor, the information about the shape of the member to be inspected, the drawing information of the inspection site, and the information about the planned installation position of the three-dimensional sensor (Step S102). Next, virtual point group data is generated a plurality of times for each type of the member to be inspected to be placed at the inspection site for each distance between the planned placement position of the member to be inspected and the planned installation position of the three-dimensional sensor and the ranges of variations of the variances of the point group data in the predetermined direction are obtained (Step S103). Next, it is determined as to whether or not the member to be inspected can be distinguished at the planned placement position thereof based on the ranges of variations of the variances of the point group data of each type of the member to be inspected in the predetermined direction corresponding to the distance between the planned placement position of the member to be inspected and the planned installation positon of the three-dimensional sensor (Step S104).

As described above, according to the inspection support apparatus 110 according to the second example embodiment, it is possible to facilitate formulation of an inspection plan for carrying out inspection of checking whether or not an intended member to be inspected is located at the predetermined position by measuring one or more members to be inspected using a three-dimensional sensor.

Note the members to be inspected to which the inspection support apparatus according to the above-described example embodiment can be applied are not limited to reinforcing bars, but include all members having similar shapes and different diameters such as reinforcing bars.

In the above example embodiments, the present disclosure has been described as a hardware configuration, but the present disclosure is not limited thereto. It is also possible to implement each processing by causing a CPU (Central Processing Unit) to execute a program.

The program for implementing the above processing can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure has been described with reference to the example embodiments, the present disclosure is not limited to the above. The configurations and details of the present disclosure can be modified in various ways that can be understood by those skilled in the art within the scope of the disclosure.

REFERENCE SIGNS LIST 10, 110 INSPECTION SUPPORT APPARATUS
11, 111 ACQUISITION UNIT
12, 112 SIMULATION UNIT
13, 113 DETERMINATION UNIT
120 THREE-DIMENSIONAL SENSOR
130 MOBILE TERMINAL
130a TOUCH PANEL

What is claimed is:

1. An inspection support apparatus comprising:
one or more memories storing instructions; and
one or more processors configured to execute the instructions to implement:
an acquisition unit configured to acquire information about specifications of a three-dimensional sensor configured to irradiate one or more members to be inspected with a beam and acquire point group data based on at least amplitude information of light, information about a shape and a planned placement position of each member to be inspected, and information about a planned installation position of the three-dimensional sensor;
a simulation unit configured to:
calculate a distance between the planned placement position of each member to be inspected and the planned installation position of the three-dimensional sensor based on the information acquired by the acquisition unit,
generate virtual point group data, which is point group data estimated at the calculated distance, a plurality of times for each calculated distance and for each member to be inspected having different shapes, and
obtain a range of variations of variances of the virtual point group data in a predetermined direction based on the virtual point group data generated the plurality of times; and
a determination unit configured to determine whether or not each member to be inspected can be distinguished at the planned placement position thereof based on the range of variations obtained by the simulation unit.

2. The inspection support apparatus according to claim 1, wherein the determination unit is configured to determine whether or not each member to be inspected can be distinguished at the planned placement position thereof in accordance with a degree of the overlapping of the range of variations corresponding to the distance between the planned placement position of each member to be inspected and the planned installation position of the three-dimensional sensor based on the shape of the respective members to be inspected.

3. The inspection support apparatus according to claim 2, wherein the determination unit is configured to estimate a number of times a measurement needs to be actually performed at an inspection site at the respective planned placement positions based on the degree of the overlapping of the range of the variations of the variances of the virtual point group data of each member to be inspected at the respective planned placement positions of the members to be inspected.

4. The inspection support apparatus according to claim 3, wherein the determination unit is configured to determine that it is impossible to distinguish each member to be inspected at the respective planned placement positions when the number of times exceeds a predetermined threshold value.

5. The inspection support apparatus according to claim 1, further comprising a display configured to display a determination result obtained by the determination unit in a superimposed manner on a drawing of an inspection site for every planned placement position of the member to be inspected at the inspection site.

6. The inspection support apparatus according to claim 1, wherein the member to be inspected is a deformed bar.

7. An inspection support method comprising:
acquiring information about specifications of a three-dimensional sensor configured to irradiate one or more members to be inspected with a beam and acquiring point group data based on at least amplitude information of light, information about a shape and a planned placement position of each member to be inspected, and information about a planned installation position of the three-dimensional sensor;
calculating a distance between the planned placement position of the member to be inspected and the planned installation position of the three-dimensional sensor for each member to be inspected based on the information acquired, generating virtual point group data, which is point group data estimated at the calculated distance, a plurality of times for each calculated distance and for each member to be inspected having different shapes, and obtaining a range of variations of the variance of the virtual point group data in a predetermined direction based on the virtual point group data generated the plurality of times; and
determining whether or not each member to be inspected can be distinguished at the planned placement position thereof based on the range of variations obtained.

8. A non-transitory computer-readable medium storing a program for causing a computer to execute:
acquiring information about specifications of a three-dimensional sensor configured to irradiate one or more members to be inspected with a beam and acquiring point group data based on at least amplitude information of light, information about a shape and a planned placement position of each member to be inspected, and information about a planned installation position of the three-dimensional sensor;
calculating a distance between the planned placement position of the member to be inspected and the planned installation position of the three-dimensional sensor for each member to be inspected based on the information acquired, generating virtual point group data, which is point group data estimated at the calculated distance, a plurality of times for each calculated distance and for each member to be inspected having different shapes, and obtaining a range of variations of the variance of the virtual point group data in a predetermined direction based on the virtual point group data generated the plurality of times; and
determining whether or not each member to be inspected can be distinguished at the planned placement position thereof based on the range of variations obtained.

* * * * *